US012035115B2

(12) United States Patent
Saito et al.

(10) Patent No.: US 12,035,115 B2
(45) Date of Patent: Jul. 9, 2024

(54) SPEAKER DISTORTION CORRECTION DEVICE

(71) Applicant: Alps Alpine Co., LTD, Tokyo (JP)

(72) Inventors: Yuji Saito, Fukushima (JP); Hiroki Toita, Fukushima (JP); Hiroyuki Taguchi, Fukushima (JP); Ryosuke Tachi, Fukushima (JP); Tatsuya Mashiko, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 180 days.

(21) Appl. No.: 17/860,861

(22) Filed: Jul. 8, 2022

(65) Prior Publication Data

US 2023/0012785 A1 Jan. 19, 2023

(30) Foreign Application Priority Data

Jul. 16, 2021 (JP) ................................ 2021-117549

(51) Int. Cl.
*H04R 3/00* (2006.01)

(52) U.S. Cl.
CPC .................................. *H04R 3/007* (2013.01)

(58) Field of Classification Search
CPC ................................ H04R 3/002; H04R 3/007
(Continued)

(56) References Cited

U.S. PATENT DOCUMENTS

2015/0086025 A1* 3/2015 Oyetunji ................ H04R 3/007 381/55
2016/0241960 A1* 8/2016 Cheng .................. H03G 3/3005
(Continued)

FOREIGN PATENT DOCUMENTS

JP H07 84584 A 3/1995
JP 2007 081815 A 3/2007
(Continued)

OTHER PUBLICATIONS

Extended European Search Report from corresponding European application No. EP 22183593.7-1207, Dec. 13, 2022, 5 pp.
(Continued)

*Primary Examiner* — William A Jerez Lora
(74) *Attorney, Agent, or Firm* — Crowell & Moring LLP

(57) ABSTRACT

In a speaker distortion correction device, an input signal passes through a nonlinear-portion correction filter and is input into a linear inverse filter. An output signal from the linear inverse filter is output into a speaker through an amplifier. For the nonlinear-portion correction filter, transfer characteristics (filter coefficients) are set that eliminate distortion due to nonlinear characteristics of the speaker. With a difference, as an error, between vibration of the speaker without distortion relative to an input signal and vibration of a vibration system of the speaker measured by a vibration measurement unit, an adaptive-algorithm execution unit performs an adaptive operation that adaptively updates filter coefficients of the linear inverse filter. When the amplitude of vibration of the vibration system of the speaker measured by the vibration measurement unit deviates from a range that normal relative to an input voltage input into the speaker, a control unit stops the adaptive operation of the adaptive-algorithm execution unit.

18 Claims, 7 Drawing Sheets

(58) Field of Classification Search
USPC ........................ 381/71.4, 94.8, 94.9, 96, 121
See application file for complete search history.

(56) References Cited

U.S. PATENT DOCUMENTS

| | | | | |
|---|---|---|---|---|
| 2021/0136491 | A1* | 5/2021 | Hodges | H04R 3/04 |
| 2021/0204043 | A1* | 7/2021 | Christoph | H04R 3/007 |
| 2022/0277725 | A1* | 9/2022 | Tani | B60R 11/02 |

FOREIGN PATENT DOCUMENTS

| | | | |
|---|---|---|---|
| JP | 2008-228214 | A | 9/2008 |
| JP | 2010-124026 | A | 6/2010 |
| JP | 6522668 | B2 | 5/2019 |
| WO | WO 2017 /179539 | A1 | 10/2017 |

OTHER PUBLICATIONS

Klippel, "Modeling the Large Signal Behavior of Micro-speakers," 133rd Audio Engineering Society Convention, Paper No. 8749, Oct. 25, 2012, 30 pp.

* cited by examiner

SPEAKER DISTORTION CORRECTION DEVICE

RELATED APPLICATION

The present application claims priority to Japanese Patent Application Number 2021-117549, filed Jul. 16, 2021, the entirety of which is hereby incorporated by reference.

BACKGROUND

1. Field of the Invention

The present invention relates to a technique that corrects distortion of output from a speaker relative to input.

2. Description of the Related Art

Various equivalent circuits of speakers, and techniques that control driving of a speaker on the basis of an equivalent circuit, are known ("Modeling the large signal behavior of micro-speakers", 133rd Audio Engineering Society Convention 2012, Paper Number 8749, Oct. 25, 2012, written by Klippel, Wolfgang, and WO 2017/179539 A).

Further, as a technique that controls driving of a speaker on the basis of an equivalent circuit, a technique is also known that corrects a sound signal that drives a speaker to remove distortion of output from the speaker relative to input, on the basis of an equivalent circuit of the speaker (JP 6522668 B2).

Further, a technique of Motional Feedback is also known that is equipped with a sensor detecting vibration of a diaphragm of a speaker, and according to the vibration detected by the sensor, controls driving of the speaker (e.g., JP 2008-228214 A and JP 2010-124026 A).

SUMMARY

It is conceivable that a technique of Motional Feedback is used to detect vibration of a diaphragm of a speaker, and according to the detected vibration, correct a sound signal that drives the speaker to remove distortion of the speaker.

Further, in this case, it is conceivable that an adaptive filter is applied to the correction of a sound signal, and coefficients of the adaptive filter are updated to minimize an error that is the difference between an ideal vibration and detected vibration to remove distortion of the speaker.

On the other hand, characteristics of a speaker include linear characteristics and nonlinear characteristics. For example, in an equivalent circuit of a speaker illustrated in FIG. 7, Bl, KMS, Le(x, i), and the like represent nonlinear characteristics.

Note that the equivalent circuit in FIG. 7 is an equivalent circuit illustrated in the above-described "Modeling the large signal behavior of micro-speakers", 133rd Audio Engineering Society Convention 2012, Paper Number 8749, Oct. 25, 2012, written by Klippel, Wolfgang.

Re is the electrical resistance.

Le(x, i) is the electrical inductance.

Bl(x) is the force factor.

Fm(x, i) is the reluctance force.

Mms is the mechanical mass.

Rms(v) is the mechanical resistance.

Kms(x) is the stiffness.

When an adaptive filter is configured to deal with such nonlinear characteristics of a speaker, the process and configuration of the adaptive filter become large-scale and increase the cost.

Therefore, it is conceivable that a nonlinear-distortion correction filter that corrects distortion due to nonlinear characteristics of a speaker is provided at a stage before an adaptive filter, and distortion due to linear characteristics of the speaker is corrected with the adaptive filter while transfer characteristics of the nonlinear-distortion correction filter are updated according to the variation in the nonlinear characteristics of the speaker estimated from the variation in the environment, such as a temperature and the behavior of the speaker.

In this case, however, when a variation in the state of the speaker itself, such as heating, freezing, a malfunction, foreign matter coming into contact with or adhering to the speaker, or the like occurs, distortion due to the nonlinear characteristics of the speaker cannot be corrected with the nonlinear-distortion correction filter, the adaptive filter diverges, and an unusual operation, such as output of an unpleasant sound from the speaker, may occur.

Therefore, a problem exists to restrict the occurrence of the unusual operation while appropriately correcting distortion of a speaker with a relatively simple configuration.

SUMMARY

To solve the above problem, an aspect of the present disclosure is a speaker distortion correction device for correcting distortion of output from a speaker relative to an input signal, the speaker distortion correction device including: a vibration detection unit configured to detect vibration of a vibration system of the speaker; a variable filter into which the input signal is input and configured to output an output signal that drives the speaker; an adaptive-algorithm execution unit configured to execute a predetermined adaptive algorithm to perform an adaptive operation that updates a transfer characteristic of the variable filter so that vibration detected by the vibration detection unit becomes vibration without distortion relative to the input signal; and a control unit. Here, the control unit is configured to determine whether or not an amplitude of vibration detected by the vibration detection unit deviates from a range considered normal relative to a level of an output signal output by the variable filter, and when the amplitude of the vibration detected by the vibration detection unit deviates from the range considered normal relative to the level of the output signal output by the variable filter, stop an update on the transfer characteristic of the variable filter updated by the adaptive operation of the adaptive-algorithm execution unit.

Further, another aspect of the present disclosure is a speaker distortion correction device for correcting distortion of output from a speaker relative to an input signal, the speaker distortion correction device including: a vibration detection unit configured to detect vibration of a vibration system of the speaker; a nonlinear-portion correction filter into which the input signal is input; a variable filter into which output from the nonlinear-portion correction filter is input, the variable filter being configured to output an output signal that drives the speaker; an adaptive-algorithm execution unit configured to execute a predetermined adaptive algorithm to perform an adaptive operation that updates a transfer characteristic of the variable filter so that vibration detected by the vibration detection unit becomes vibration without distortion relative to the input signal; and a control unit. Here, a transfer characteristic is set for the nonlinear-portion correction filter, in which the transfer characteristic corrects distortion of output from the speaker relative to the input signal due to a nonlinear characteristic of the speaker. Further, the control unit is configured to determine whether or not the amplitude of vibration detected by the vibration detection unit deviates from a range considered normal relative to a level of an output signal output by the variable filter, and when the amplitude of the vibration detected by the vibration detection unit deviates from the range considered normal relative to the level of the output signal output by the variable filter, stop an update on the transfer characteristic of the variable filter updated by the adaptive operation of the adaptive-algorithm execution unit.

Here, the speaker distortion correction device may be configured such that the control unit is configured to, when the amplitude of vibration detected by the vibration detection unit deviates, in an excess direction, from the range considered normal, check whether or not a center of the amplitude of the vibration detected by the vibration detection unit is positionally deviated from a defined center position, when the center is positionally deviated from the defined center position, estimate stiffness of the vibration system of the speaker, from an input voltage input into the speaker, an input electric current input into the speaker, and the vibration detected by the vibration detection unit, and when the estimated stiffness is smaller than a defined stiffness range, estimate occurrence of a mechanical malfunction of the vibration system of the speaker.

Further, in this case, the speaker distortion correction device may further include an amplifier configured to drive the speaker by an output signal output by the variable filter, and the control unit may be configured to, when the amplitude of vibration detected by the vibration detection unit deviates, in the excess direction, from the range considered normal, and a center of the amplitude of the vibration detected by the vibration detection unit is not positionally deviated from the defined center position, estimate a relationship between stiffness of the vibration system of the speaker and a positional deviation of the vibration system, from an input voltage input into the speaker, an input electric current input into the speaker, and the vibration detected by the vibration detection unit, when in the estimated relationship, a variation in the stiffness relative to the positional deviation of the vibration system is gentle, check whether or not the input electric current input into the speaker relative to the input voltage input into the speaker is smaller than a defined magnitude, and when the input electric current input into the speaker relative to the input voltage input into the speaker is smaller than the defined magnitude, estimate occurrence of abnormal heating of the speaker.

Further, the speaker distortion correction device may be configured such that the control unit is configured to, when the amplitude of vibration detected by the vibration detection unit deviates, in an insufficiency direction, from the range considered normal, determine whether or not clipping within an allowable vibration range has occurred, the clipping within the allowable vibration range being a phenomenon in which a peak portion of waveform of the vibration detected by the vibration detection unit does not reach an upper or lower limit of the allowable vibration range of the vibration system of the speaker and is saturated and deformed at a fixed level, and when clipping has occurred, estimate occurrence of an abnormality that the vibration of the vibration system of the speaker is obstructed by an external object.

Further, in this case, the speaker distortion correction device may further include an amplifier configured to drive the speaker by an output signal output by the variable filter, and the control unit may be configured to, when the amplitude of vibration detected by the vibration detection unit deviates, in the insufficiency direction, from the range considered normal and clipping within the allowable vibration range has not occurred, estimate a relationship between stiffness of the vibration system of the speaker and a positional deviation of the vibration system, from an input voltage input into the speaker, an input electric current input into the speaker, and the vibration detected by the vibration detection unit, when in the estimated relationship, a variation in the stiffness relative to the positional deviation of the vibration system is steep, check whether or not the input electric current input into the speaker relative to the input voltage input into the speaker is larger than a defined magnitude, and when the input electric current input into the speaker relative to the input voltage input into the speaker is larger than the defined magnitude, estimate occurrence of abnormal heating of the speaker.

Further, in this case, the control unit may be configured to, when the amplitude of vibration detected by the vibration detection unit deviates, in the insufficiency direction, from the range considered normal, clipping within the allowable vibration range has not occurred, a variation in stiffness of the vibration system of the speaker relative to a positional deviation of the vibration system is steep, and an input electric current input into the speaker relative to an input voltage input into the speaker is not larger than the defined magnitude, check whether or not an environmental temperature is lower than a predetermined temperature, and when the environmental temperature is lower than the predetermined temperature, estimate occurrence of abnormal freezing of the speaker.

Further, the above speaker distortion correction device and the speaker may be integrated together to constitute a speaker unit.

According to the above speaker distortion correction device and speaker unit, when an abnormal measured vibration of the vibration system of the speaker occurs, an adaptive operation of an adaptive filter is stopped, and the occurrence of an unusual operation, such as the occurrence of an unpleasant sound, is restricted even when distortion of the speaker is corrected with a relatively simple configuration in which the nonlinear-portion correction filter is provided at a stage before the adaptive filter, and the adaptive filter is used to correct only distortion due to linear characteristics of the speaker. Further, since the measured vibration of the vibration system of the speaker is used to estimate the cause of an abnormality that has occurred, the estimated cause is appropriately dealt with.

As described above, according to the present disclosure, the occurrence of an unusual operation is restricted while distortion of a speaker is appropriately corrected with a relatively simple configuration.

DETAILED DESCRIPTION OF THE PREFERRED EMBODIMENTS

Hereinafter, an example in which an embodiment of the present invention is applied to an audio system mounted in an automobile will be described.

Figure 1:
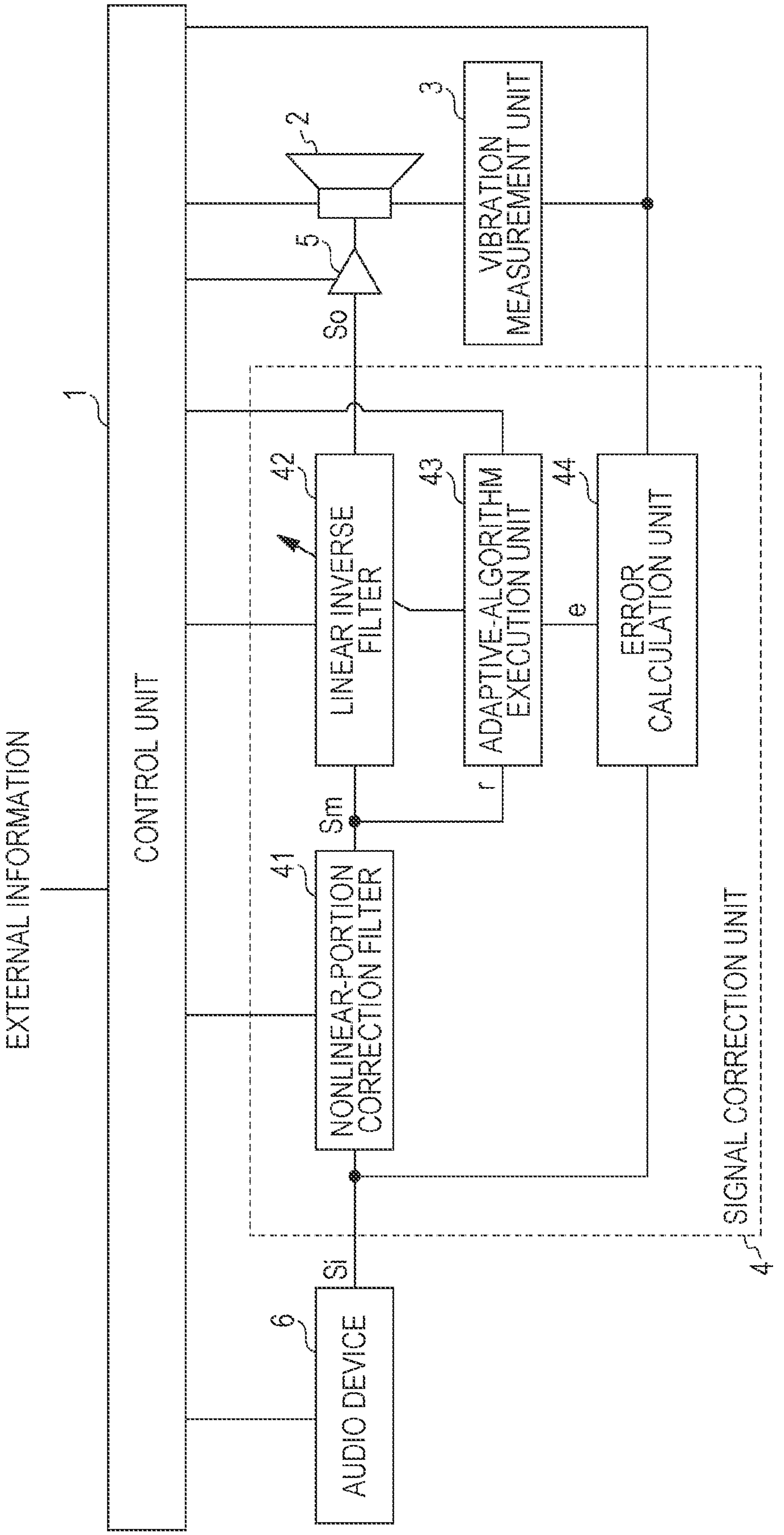
FIG. 1 is a diagram illustrating a configuration of an audio system according to an embodiment of the present invention.

FIG. 1 illustrates a configuration of the audio system according to the embodiment.

As illustrated, the audio system includes a control unit 1, a speaker 2, a vibration measurement unit 3 that measures vibration/displacement of a vibration system of the speaker 2, a signal correction unit 4 that outputs an output signal So, an amplifier 5 into which the output signal So is input and that is for driving the speaker 2, and an audio device 6 that outputs an input signal Si that is a sound signal.

The signal correction unit 4 corrects an input signal Si output by the audio device 6, and outputs the corrected input signal Si as an output signal So. The amplifier 5 converts the output signal So into an analog signal (voltage signal), amplifies the analog signal (voltage signal), and drives the speaker 2.

Figure 2:
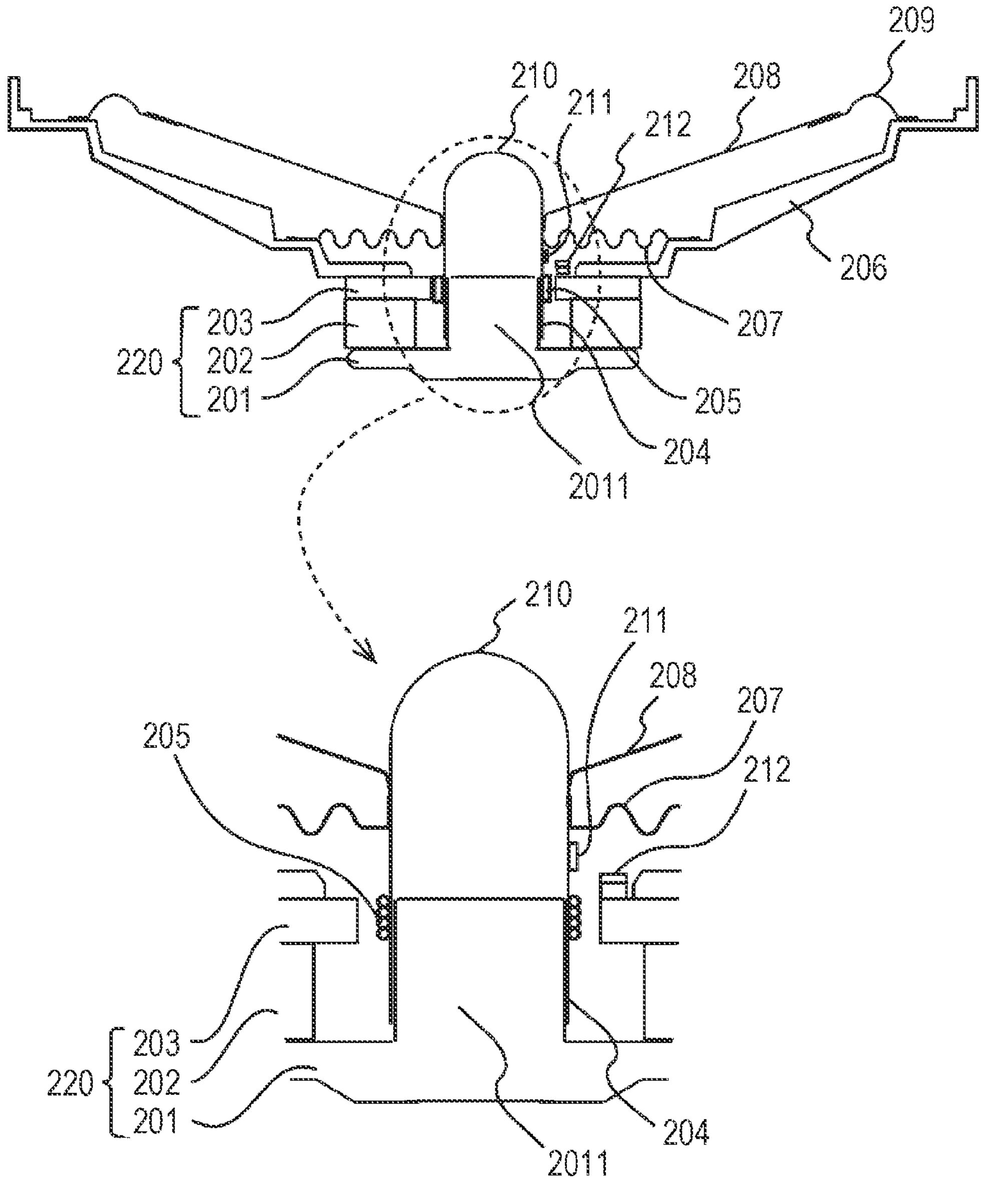
FIG. 2 is a diagram illustrating a configuration of vibration detection according to the embodiment of the present invention.

FIG. 2 illustrates a configuration of the speaker 2.

As illustrated, the speaker 2 includes a yoke 201, a magnet 202, a top plate 203, a voice coil bobbin 204, a voice coil 205, a frame 206, a damper 207, a diaphragm 208, an edge 209, a dust cap 210, a displacement detection magnet 211, and a magnetic angle sensor 212.

Here, suppose that the upper side in FIG. 2 is the front side of a front speaker and the lower side is the back side of the front speaker, the yoke 201 has a protrusion 2011 that protrudes forward at the center of the yoke 201. The magnet 202 that is annular is provided around an outer periphery portion of the protrusion 2011. The top plate 203 that is annular is provided on the magnet 202. The top plate 203 is constituted by a conductive member, such as iron. The yoke 201, the magnet 202, and the top plate 203 form a magnetic circuit 220.

The voice coil bobbin 204 has a hollow cylindrical shape. The voice coil 205 to which signals are applied from the amplifier 5 is wound around the outer periphery of the voice coil bobbin 204. The protrusion 2011 of the yoke 201 is inserted in the hollow of the voice coil bobbin 204 from behind such that the voice coil bobbin 204 can move forward and backward relative to the yoke 201. The voice coil 205 is positioned between the protrusion 2011 of the yoke 201 and the top plate 203, at a position where magnetic flux generated between inner-periphery ends of the top plate 203 by the magnetic circuit 220 passes through.

The diaphragm 208 has a shape similar to the lateral side of a conical frustum whose height direction substantially is a front-back direction of the front speaker. The outer-periphery end of the diaphragm 208 is coupled to the front end of the frame 206 by the edge 209. The inner-periphery end of the diaphragm 208 is fixed to the front end of the voice coil bobbin 204.

In such a configuration of the speaker 2, when a signal is applied to the voice coil 205 from the amplifier 5, an electromagnetic action of magnetic flux generated from the magnetic circuit 220 and the signal flowing through the voice coil 205 makes the voice coil bobbin 204 vibrate back and forth according to the amplitude of the signal. When the voice coil bobbin 204 vibrates, the diaphragm 208 coupled to the voice coil bobbin 204 vibrates, and a sound that corresponds to the signal from the amplifier 5 is generated.

The displacement detection magnet 211 is fixed to the voice coil bobbin 204 to move upward and downward with the voice coil bobbin 204. The magnetic angle sensor 212 is fixed on the top plate 203 or the like so that the position of the magnetic angle sensor 212 does not vary relative to the magnetic circuit 220.

The magnetic angle sensor 212 detects and outputs the angle of a synthetic vector of a magnetic-flux vector generated by the magnetic circuit 220 and a magnetic-flux vector generated by the displacement detection magnet 211. Due to displacement of the displacement detection magnet 211 that accompanies displacement of the voice coil bobbin 204, the magnetic-flux vector generated by the displacement detection magnet 211 seen from the magnetic angle sensor 212 varies. Therefore, the angle of the synthetic vector represents the displacement amount of the voice coil bobbin 204.

Using the output from the magnetic angle sensor 212, the vibration measurement unit 3 in FIG. 1 measures the vibration/displacement of the vibration system, such as the voice coil bobbin 204 and the diaphragm 208, of the speaker 2.

Next, information, such as the temperature in the automobile interior, and an aging time of the audio system (the manufacture year, a current time, and the like), is input into the control unit 1 as external information. Further, information about a playing state, such as music being played/no music being played, and an audio source (radio/compact disc (CD) or the like) that is outputting an input signal Si, and information, such as an output level (volume or the like), are input into the control unit 1 from the audio device 6. Further, information about an input voltage and an input electric current is input into the control unit 1 from the speaker 2.

Next, the signal correction unit 4 includes a nonlinear-portion correction filter 41, a linear inverse filter 42, an adaptive-algorithm execution unit 43, and an error calculation unit 44.

An input signal Si output by the audio device 6 passes through the nonlinear-portion correction filter 41, is input, as an intermediate corrected signal Sm, into the linear inverse filter 42, passes through the linear inverse filter 42, and is output, as an output signal So, into the speaker 2 through the amplifier 5.

Transfer characteristics (filter coefficients) of the nonlinear-portion correction filter 41 are switchable from the control unit 1. The control unit 1 sets the transfer characteristics of the nonlinear-portion correction filter 41, to transfer characteristics that eliminate distortion of output from the speaker 2 relative to an input signal Si due to nonlinear characteristics of the speaker 2 when the speaker 2 is driven by an intermediate corrected signal Sm output by the nonlinear-portion correction filter 41, that is to say, transfer characteristics that correct distortion due to the nonlinear characteristics of the speaker 2.

The error calculation unit 44 calculates a difference between vibration of the speaker 2 without the distortion relative to an input signal Si and actual vibration of the speaker 2 measured by the vibration measurement unit 3.

The linear inverse filter 42 is a variable filter. The adaptive-algorithm execution unit 43 and the linear inverse filter 42 constitute an adaptive filter. With an intermediate corrected signal Sm as a reference signal r, and a difference, as an error e, calculated by the error calculation unit 44, the adaptive-algorithm execution unit 43 performs an adaptive operation that updates transfer characteristics (filter coefficients) of the linear inverse filter 42, using a least mean squares (LMS) algorithm or the like, to minimize the error e.

As a result of the adaptive operation, transfer characteristics that correct distortion of output from the speaker 2 relative to an input signal Si due to linear characteristics of the speaker 2 are set for the linear inverse filter 42.

Next, the control unit 1 estimates current nonlinear characteristics of the speaker 2. When the nonlinear characteristics vary, the control unit 1 performs a process of updating the transfer characteristics of the nonlinear-portion correction filter 41 so that the variation is followed.

In the process, nonlinear characteristics at a time of each combination of a temperature in the automobile interior, an aging time of the audio system, and an output level of the audio device 6 are preliminarily determined and stored as a library, and nonlinear characteristics that correspond to a current environment are estimated from the library as current nonlinear characteristics of the speaker 2.

Alternatively, a behavior of the speaker 2 relative to input is calculated from vibration of the speaker 2 measured by the vibration measurement unit 3. From the calculated behavior, current nonlinear characteristics of the speaker 2 are estimated.

Then when the estimated current nonlinear characteristics of the speaker 2 vary from estimated nonlinear characteristics at a time of the previous update on the transfer characteristics of the nonlinear-portion correction filter 41 by a predetermined level or larger, the transfer characteristics of the nonlinear-portion correction filter 41 are switched to transfer characteristics that correspond to the estimated current nonlinear characteristics of the speaker 2. The transfer characteristics that correspond to the nonlinear characteristics are transfer characteristics that correct distortion due to the nonlinear characteristics. A speaker model that reflects estimated nonlinear characteristics may be used to calculate corresponding transfer characteristics. Alternatively, transfer characteristics that correspond to each set of nonlinear characteristics may be preliminarily determined and stored to calculate transfer characteristics that correspond to estimated nonlinear characteristics.

Alternatively, transfer characteristics that correspond to nonlinear characteristics at a time of each combination of a temperature in the automobile interior, an aging time of the audio system, and an output level of the audio device 6 may be preliminarily determined and stored as a library, transfer characteristics that correspond to current nonlinear characteristics of the speaker 2 may be selected from the library, and the transfer characteristics of the nonlinear-portion correction filter 41 may be switched to the selected transfer characteristics.

Next, an adaptive-operation control process periodically and repeatedly performed by the control unit 1 will be described.

Figure 3:
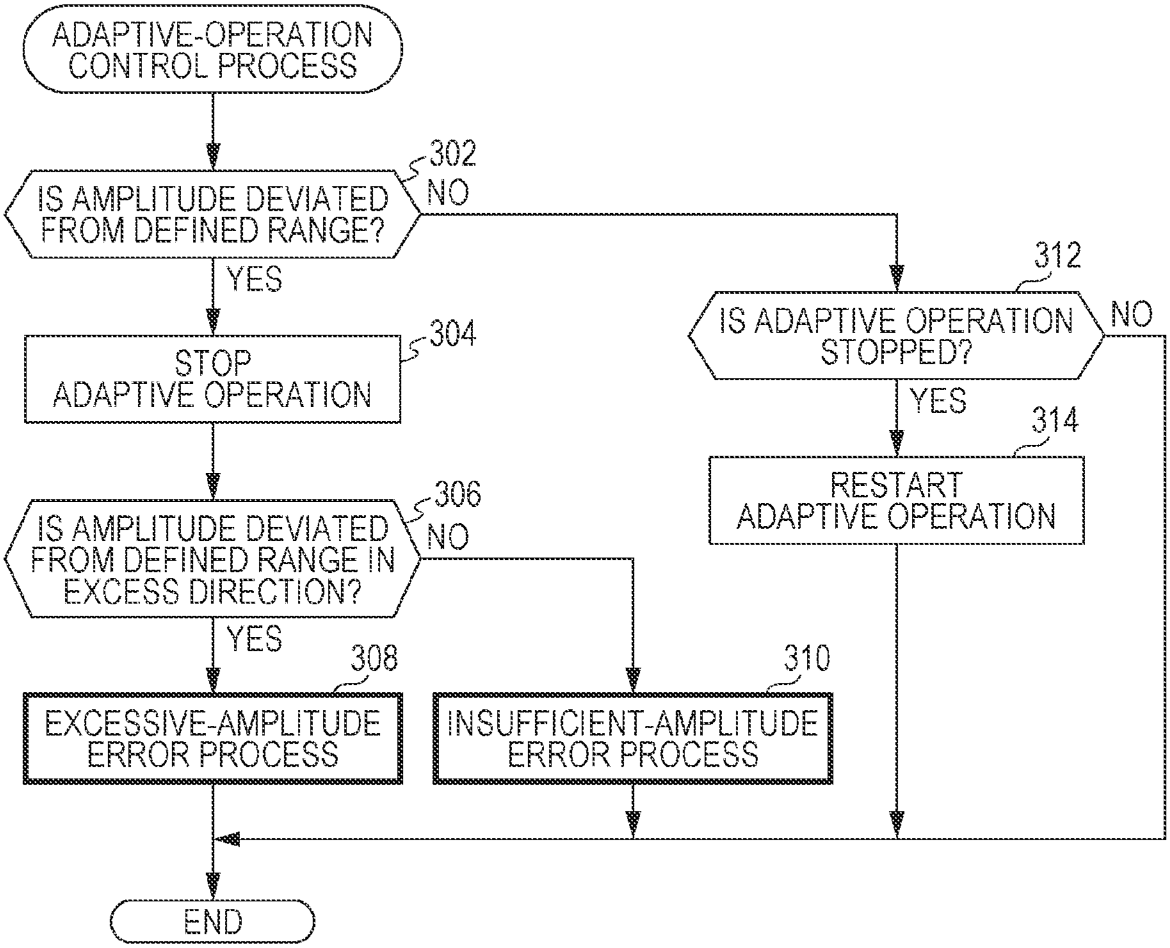
FIG. 3 is a flowchart illustrating an adaptive-operation control process according to the embodiment of the present invention.

FIG. 3 illustrates a procedure of the adaptive-operation control process.

As illustrated, in the adaptive-operation control process, the control unit 1 determines whether or not the amplitude of vibration measured by the vibration measurement unit 3 deviates from a defined range that is a range considered normal relative to the level of an output signal So from the linear inverse filter 42 (step 302). For the level of an output signal So from the linear inverse filter 42, the level of the output signal So may be directly detected or may be estimated from the level of output from the audio device 6 or the nonlinear-portion correction filter 41, an input voltage input into the speaker 2, or the like.

When the amplitude of vibration measured by the vibration measurement unit 3 deviates from the defined range, an adaptive operation of the adaptive-algorithm execution unit 43 is stopped, and the update on the transfer characteristics of the linear inverse filter 42 is stopped (step 304).

Then it is determined whether the amplitude of the vibration deviates, in an excess direction, from the defined range, or deviates, in an insufficiency direction, from the defined range (step 306). When the amplitude of the vibration deviates, in the excess direction, from the defined range, an excessive-amplitude error process is executed (step 308), and the adaptive-operation control process is ended.

On the other hand, when the amplitude of the vibration deviates, in the insufficiency direction, from the defined range, an insufficient-amplitude error process is executed (step 310), and the adaptive-operation control process is ended.

In step 302, when it is determined that the amplitude of the vibration does not deviate from the defined range, it is checked whether or not an adaptive operation of the adaptive-algorithm execution unit 43 is currently stopped (step 312). When an adaptive operation of the adaptive-algorithm execution unit 43 is not stopped, the adaptive-operation control process is ended.

On the other hand, when an adaptive operation of the adaptive-algorithm execution unit 43 is currently stopped (step 312), the adaptive operation of the adaptive-algorithm execution unit 43 is restarted (step 314), the update on the transfer characteristics of the linear inverse filter 42 is restarted, and the adaptive-operation control process is ended.

Next, the excessive-amplitude error process performed in step 308 and the insufficient-amplitude error process performed in step 310 of the adaptive-operation control process will be described.

First, the excessive-amplitude error process will be described.

Figure 4:
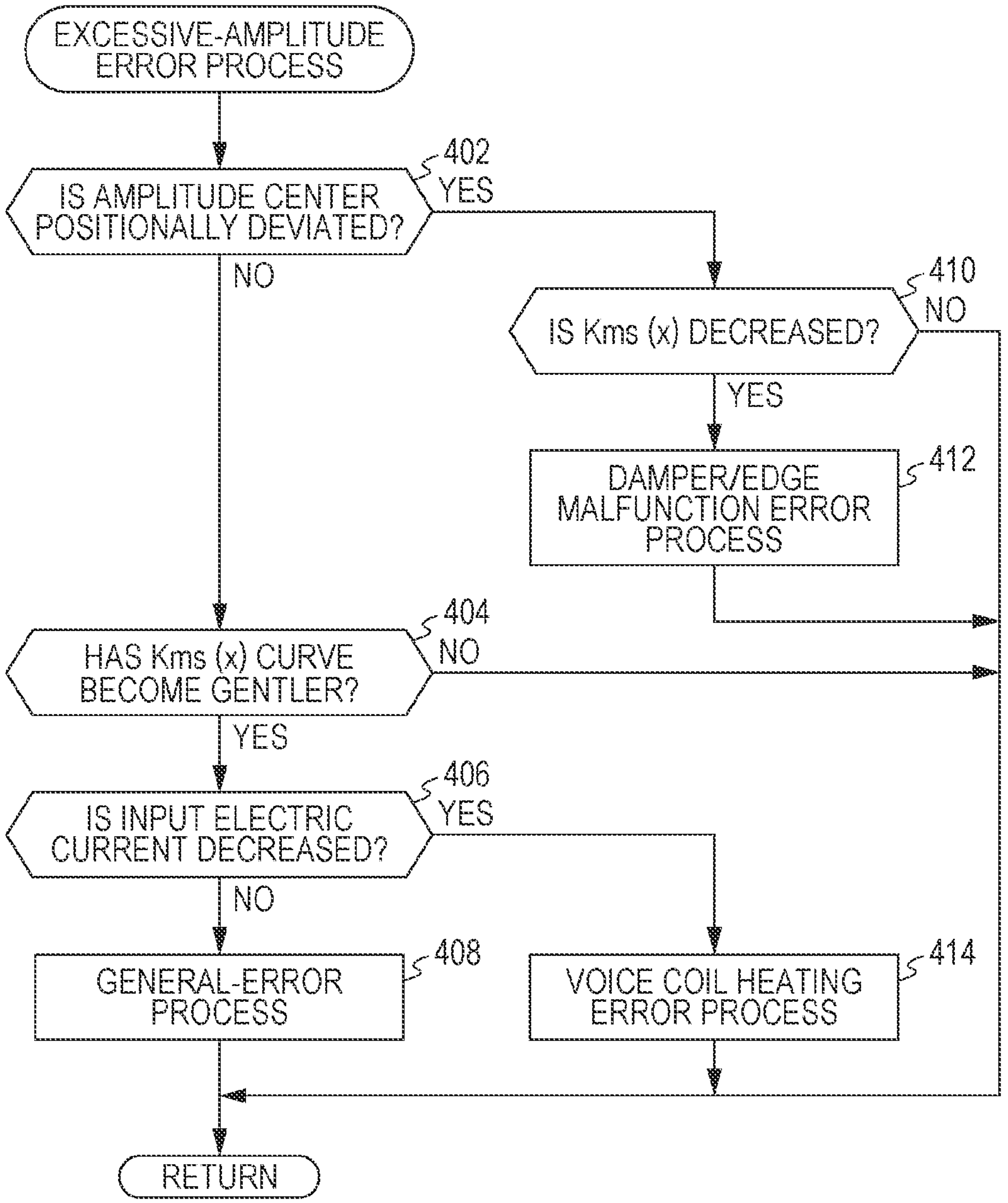
FIG. 4 is a flowchart illustrating an excessive-amplitude error process according to the embodiment of the present invention.

FIG. 4 illustrates a procedure of the excessive-amplitude error process.

As illustrated, in the excessive-amplitude error process, the control unit 1 checks whether or not the center of an amplitude of vibration measured by the vibration measurement unit 3 is positionally deviated (shifted) from a normal position by a predetermined level or larger (step 402).

When in step 402 it is determined that the center of the amplitude of the vibration is positionally deviated from the normal position by the predetermined level or larger, it is checked whether or not Kms(x) is entirely smaller than a standard value (step 410).

Here, the calculation of Kms(x) of an equivalent circuit of the speaker 2 is performed as follows:

That is to say, while an appropriate output signal So, such as a test signal, a music signal, or an audio watermark signal, is output into the speaker 2, an input electric current i input into the speaker 2 and an input voltage u input into the speaker 2 are measured, and a resonant frequency fs of an impedance Z=u/i of the speaker 2 is detected from the measured input electric current i and input voltage u.

Then a mechanical mass (Mms) is used
to calculate Kms=(2·π·fs)2·Mms.

The relationship between a displacement x of the vibration system of the speaker 2 output by the magnetic angle sensor 212 and Kms is calculated as Kms(x).

Figure 6:
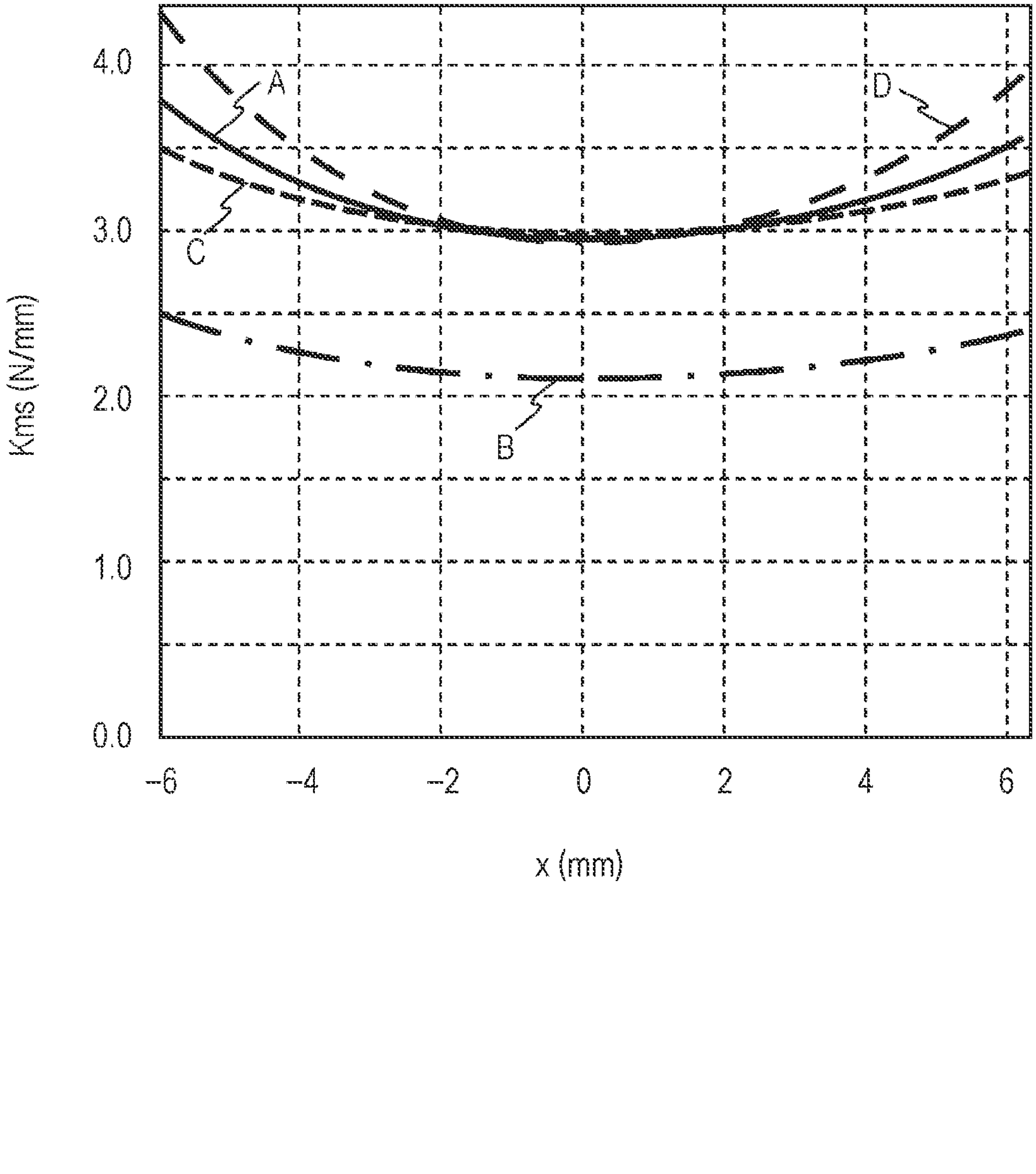
FIG. 6 is a graph illustrating examples of a Kms(x) curve.
Figure 7:
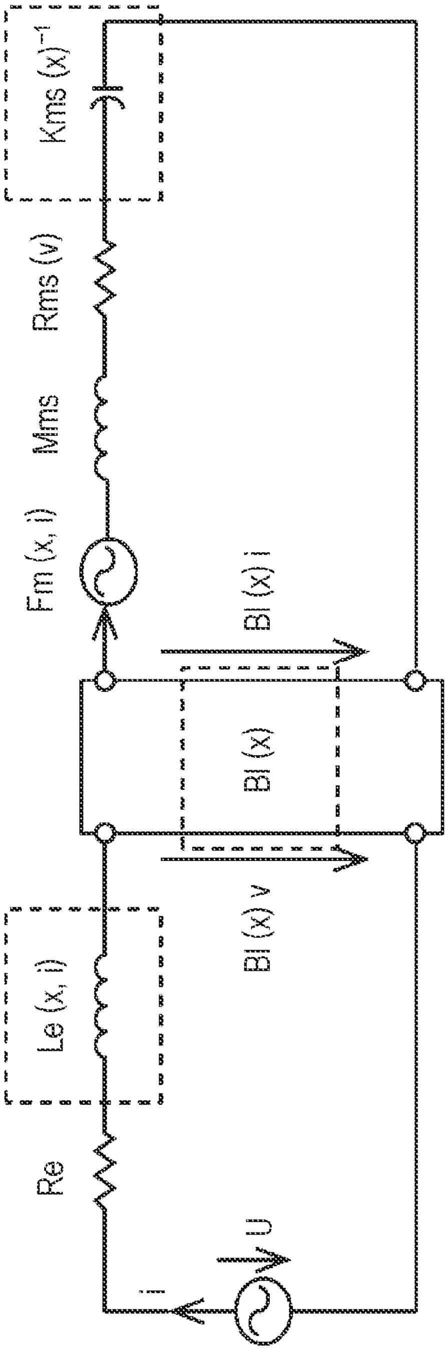
FIG. 7 is a diagram illustrating an example of an equivalent circuit of a speaker.

Here, when in step 410, the curve of Kms(x) is, for example, a Kms(x) curve B that entirely has values smaller than a standard Kms(x) curve A illustrated in FIG. 6, it is determined that the current Kms(x) curve is entirely smaller than the standard values.

When Kms(x) is not entirely smaller than the standard values (step 410), a general-error process is performed (step 408), and the excessive-amplitude error process is ended.

In the general-error process in step 408, an error message that informs there is a possibility that an abnormality occurs at the speaker 2 is displayed or output by a sound.

On the other hand, when Kms(x) is entirely smaller than the standard values (step 410), a damper/edge malfunction error process is performed because the stiffness of the speaker 2 decreases (step 412), and the excessive-amplitude error process is ended.

In the damper/edge malfunction error process in step 412, an error message that informs there is a possibility that the damper 207 or the edge 209 of the speaker 2 malfunctions is displayed or output by a sound.

On the other hand, when the center of the amplitude of the vibration is not positionally deviated (step 402), it is checked whether or not a current Kms(x) (stiffness) curve of the equivalent circuit of the speaker 2 is gentler than a standard Kms(x) curve preliminarily set (step 404).

That is to say, when the curve of calculated Kms(x) is, for example, a Kms(x) curve C that has a curve gentler than the standard Kms(x) curve A illustrated in FIG. 6, it is determined in step 404 that the current Kms(x) curve is gentler than the standard Kms(x) curve.

When in step 404, it is determined that a current Kms(x) curve is not gentler than the standard Kms(x) curve, the general-error process is performed (step 408), and the excessive-amplitude error process is ended.

On the other hand, when a current Kms(x) curve is gentler than the standard Kms(x) curve (step 404), the fact indicates that the vibration system of the speaker 2 is likely to be displaced relative to an input voltage. Therefore, it is checked whether or not the magnitude of an input electric current input into the speaker 2 relative to an input voltage input into the speaker 2 is smaller than a defined magnitude, that is to say, whether or not the resistance of the speaker 2 increases (step 406).

When in step 406 it is determined that the magnitude of an input electric current input into the speaker 2 relative to an input voltage input into the speaker 2 is smaller than the defined magnitude, a voice coil heating error process is performed, considering a possibility that the voice coil 205 is heated due to the increase in the resistance of the speaker 2 (step 414), and the excessive-amplitude error process is ended.

In the voice coil heating error process in step 414, an error message that informs there is a possibility that the voice coil 205 is heated is displayed or output by a sound, and a process of decreasing the gain of the amplifier 5 to restrict the heat generation is performed.

On the other hand, when the magnitude of an input electric current input into the speaker 2 relative to an input voltage input into the speaker 2 is not smaller than the defined magnitude, the general-error process is performed (step 408), and the excessive-amplitude error process is ended.

The excessive-amplitude error process is described above.

Next, the insufficient-amplitude error process will be described.

Figure 5:
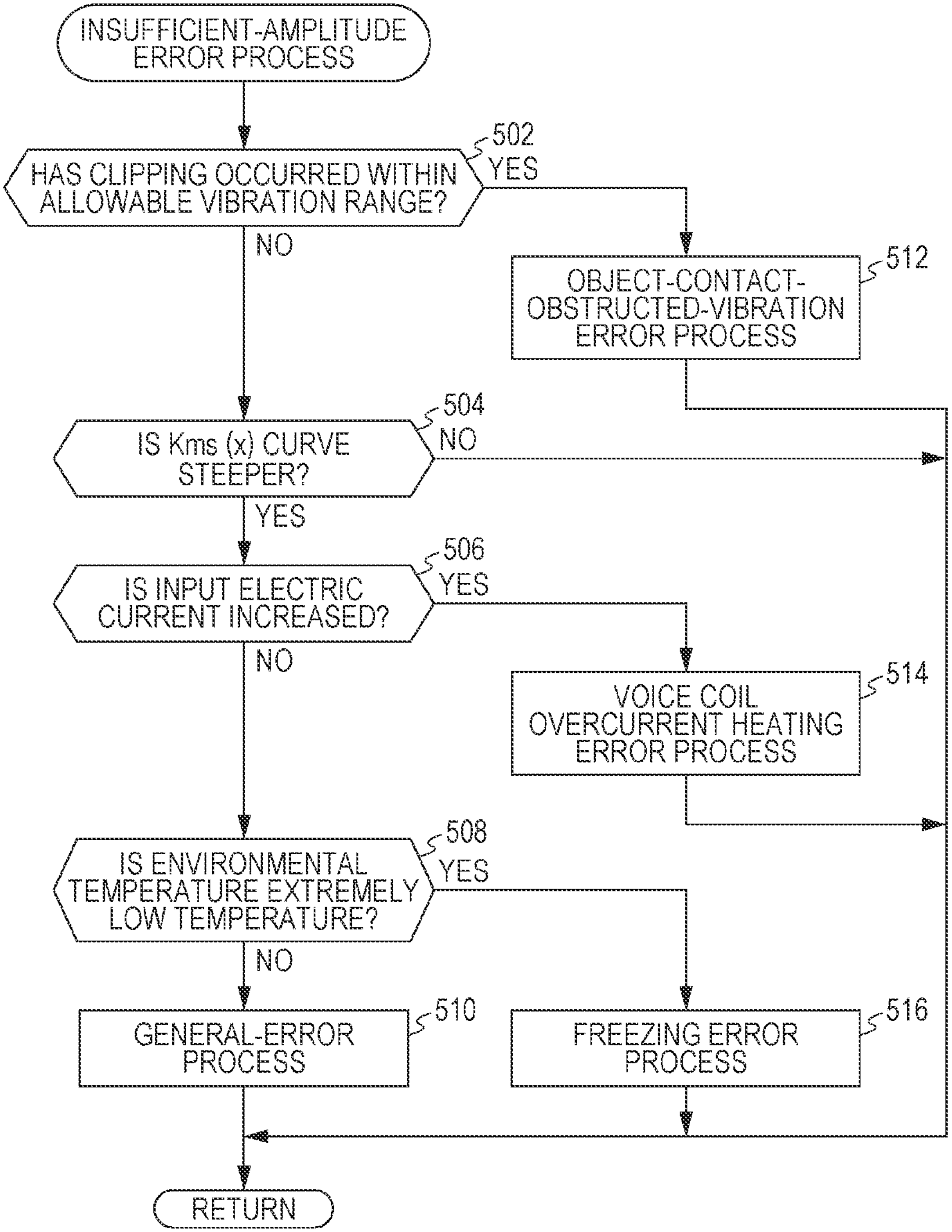
FIG. 5 is a flowchart illustrating an insufficient-amplitude error process according to the embodiment of the present invention.

FIG. 5 illustrates a procedure of the insufficient-amplitude error process.

As illustrated, in the insufficient-amplitude error process, the control unit 1 checks whether or not, in vibration measured by the vibration measurement unit 3, clipping within the allowable vibration range has occurred (step 502). The clipping within the allowable vibration range is a phenomenon in which peak portions of the vibration waveform do not reach an upper or lower limit of the allowable vibration range and are saturated and deformed at a fixed level.

When in step 502 it is determined that clipping within the allowable vibration range occurs, an object-contact-obstructed-vibration error process is performed (step 512), and the insufficient-amplitude error process is ended.

In the object-contact-obstructed-vibration error process in step 512, an error message that informs there is a possibility that an abnormality due to object contact occurs at the speaker 2 is displayed or output by a sound, and a process of decreasing the gain of the amplifier 5 is performed to make peaks of vibration of the vibration system of the speaker 2 smaller than the level at which the saturation of the vibration waveform occurs.

On the other hand, when clipping within the allowable vibration range has not occurred (step 502), it is checked whether or not a current Kms(x) curve of the equivalent circuit of the speaker 2 is steeper than a standard Kms(x) curve preliminarily set (step 504).

When in step 504 the curve of Kms(x) is, for example, a Kms(x) curve D that has a curve steeper than the standard Kms(x) curve A illustrated in FIG. 6, it is determined that the current Kms(x) curve is steeper than the standard Kms(x) curve.

When in step 504 it is not determined that a current Kms(x) curve of the equivalent circuit of the speaker 2 is steeper than the standard Kms(x) curve preliminarily set, a general-error process is performed (step 510), and the insufficient-amplitude error process is ended.

In the general-error process in step 510, an error message that informs there is a possibility that an abnormality occurs at the speaker 2 is displayed or output by a sound.

On the other hand, when it is determined that a current Kms(x) curve is steeper than the standard Kms(x) curve (step 504), the fact indicates that the vibration system of the speaker 2 is less likely to be displaced relative to an input voltage input into the speaker 2. Therefore, it is checked whether or not the magnitude of an input electric current input into the speaker 2 relative to an input voltage input into the speaker 2 is larger than a defined magnitude by a predetermined level or larger, that is to say, whether or not the resistance of the speaker 2 decreases (step 506).

When in step 506 it is determined that the magnitude of an input electric current input into the speaker 2 relative to an input voltage input into the speaker 2 is larger than the defined magnitude by the predetermined level or larger, a voice coil overcurrent heating error process is performed (step 514), and the insufficient-amplitude error process is ended.

In the voice coil overcurrent heating error process in step 514, an error message that informs there is a possibility that a malfunction due to short circuit occurs at the speaker 2 is displayed or output by a sound, and operation of the amplifier 5 is stopped.

On the other hand, when the magnitude of an input electric current input into the speaker 2 relative to an input voltage input into the speaker 2 is not larger than the defined magnitude by the predetermined level or larger (step 506), it is checked whether or not the temperature in the automobile interior is an extremely low temperature to the degree at which freezing occurs (step 508). When the temperature in the automobile interior is not an extremely low temperature, the general-error process is performed (step 510), and the insufficient-amplitude error process is ended.

On the other hand, when in step 508, it is determined that the temperature in the automobile interior is an extremely low temperature, a freezing error process is performed (step 516), and the insufficient-amplitude error process is ended.

In the freezing error process in step 516, an error message that informs there is a possibility that freezing occurs at the speaker 2 is displayed or output by a sound.

The insufficient-amplitude error process is described above.

In this way, according to the present embodiment, when an abnormality of measured vibration of the vibration system of the speaker 2 occurs, an adaptive operation of the adaptive filter is stopped, and the occurrence of an abnormal operation, such as the occurrence of an unpleasant sound, is restricted while distortion of the speaker 2 is appropriately corrected with a relatively simple configuration in which the nonlinear-portion correction filter 41 is provided at a stage before the adaptive filter, and the adaptive filter is used to correct only distortion due to linear characteristics of the speaker 2. Further, the measured vibration of the vibration system of the speaker 2 is used to estimate the cause of an abnormality that has occurred, and the estimated cause is appropriately dealt with.

When in the above embodiment the speaker 2 is used in which distortion due to nonlinear characteristics does not occur, or distortion due to nonlinear characteristics is sufficiently small, the nonlinear-portion correction filter 41 may not be provided, and an input signal Si may be directly input into the linear inverse filter 42. Even in such a case, due to the processes in FIGS. 3, 4, and 5, the occurrence of an abnormal operation, such as the occurrence of an unpleasant sound, is restricted, the cause of an abnormality that has occurred is estimated, and the estimated cause is appropriately dealt with.

Further, in the above embodiment, the speaker 2, the vibration measurement unit 3, and the signal correction unit 4 may be integrated together as a speaker unit.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A speaker distortion correction device for correcting distortion of output from a speaker relative to an input signal, the speaker distortion correction device comprising:

a vibration detection unit configured to detect vibration of a vibration system of the speaker;

a variable filter into which the input signal is input, the variable filter being configured to output an output signal that drives the speaker;

an adaptive-algorithm execution unit configured to execute a predetermined adaptive algorithm to perform an adaptive operation that updates a transfer characteristic of the variable filter so that vibration detected by the vibration detection unit becomes vibration without distortion relative to the input signal; and a control unit, wherein the control unit is configured to determine whether or not an amplitude of vibration detected by the vibration detection unit deviates from a range considered normal relative to a level of an output signal output by the variable filter, and when the amplitude of the vibration detected by the vibration detection unit deviates from the range considered normal relative to the level of the output signal output by the variable filter, stop an update on the transfer characteristic of the variable filter updated by the adaptive operation of the adaptive-algorithm execution unit.

2. The speaker distortion correction device according to claim 1, wherein the control unit is configured to, when the amplitude of vibration detected by the vibration detection unit deviates, in an excess direction, from the range considered normal, check whether or not a center of the amplitude of the vibration detected by the vibration detection unit is positionally deviated from a defined center position, when the center is positionally deviated from the defined center position, estimate stiffness of the vibration system of the speaker from an input voltage input into the speaker, an input electric current input into the speaker, and the vibration detected by the vibration detection unit, and when the estimated stiffness is smaller than a defined stiffness range, estimate occurrence of a mechanical malfunction of the vibration system of the speaker.

3. The speaker distortion correction device according to claim 2, further comprising an amplifier configured to drive the speaker by an output signal output by the variable filter, wherein the control unit is configured to, when the amplitude of vibration detected by the vibration detection unit deviates, in the excess direction, from the range considered normal, and the center of the amplitude of the vibration detected by the vibration detection unit is not positionally deviated from the defined center position, estimate a relationship between stiffness of the vibration system of the speaker and a positional deviation of the vibration system from an input voltage input into the speaker, an input electric current input into the speaker, and the vibration detected by the vibration detection unit, when, in the estimated relationship, a variation in the stiffness relative to the positional deviation of the vibration system is gentle, check whether or not the input electric current input into the speaker relative to the input voltage input into the speaker is smaller than a defined magnitude, and when the input electric current input into the speaker relative to the input voltage input into the speaker is smaller than the defined magnitude, estimate occurrence of a heating abnormality of the speaker.

4. The speaker distortion correction device according to claim 1, wherein the control unit is configured to, when the amplitude of vibration detected by the vibration detection unit deviates, in an insufficiency direction, from the range considered normal, determine whether or not clipping within an allowable vibration range has occurred, the clipping within the allowable vibration range being a phenomenon in which a peak portion of waveform of the vibration detected by the vibration detection unit does not reach an upper or lower limit of the allowable vibration range of the vibration system of the speaker and is saturated and deformed at a fixed level, and when clipping has occurred, estimate occurrence of an abnormality that the vibration of the vibration system of the speaker is obstructed by an external object.

5. The speaker distortion correction device according to claim 4, further comprising an amplifier configured to drive the speaker by an output signal output by the variable filter, wherein the control unit is configured to, when the amplitude of vibration detected by the vibration detection unit deviates, in the insufficiency direction, from the range considered normal and clipping within the allowable vibration range has not occurred, estimate a relationship between stiffness of the vibration system of the speaker and a positional deviation of the vibration system from an input voltage input into the speaker, an input electric current input into the speaker, and the vibration detected by the vibration detection unit, when in the estimated relationship, a variation in the stiffness relative to the positional deviation of the vibration system is steep, check whether or not the input electric current input into the speaker relative to the input voltage input into the speaker is larger than a defined magnitude, and when the input electric current input into the speaker relative to the input voltage input into the speaker is larger than the defined magnitude, estimate occurrence of a heating abnormality of the speaker.

6. The speaker distortion correction device according to claim 5, wherein the control unit is configured to, when the amplitude of vibration detected by the vibration detection unit deviates, in the insufficiency direction, from the range considered normal, clipping within the allowable vibration range has not occurred, a variation in stiffness of the vibration system of the speaker relative to a positional deviation of the vibration system is steep, and an input electric current input into the speaker relative to an input voltage input into the speaker is not larger than the defined magnitude, check whether or not an environmental temperature is lower than a predetermined temperature, and when the environmental temperature is lower than the predetermined temperature, estimate occurrence of a freezing abnormality of the speaker.

7. A speaker distortion correction device for correcting distortion of output from a speaker relative to an input signal, the speaker distortion correction device comprising:

a vibration detection unit configured to detect vibration of a vibration system of the speaker;

a nonlinear-portion correction filter into which the input signal is input;

a variable filter into which output from the nonlinear-portion correction filter is input, the variable filter being configured to output an output signal that drives the speaker;

an adaptive-algorithm execution unit configured to execute a predetermined adaptive algorithm to perform an adaptive operation that updates a transfer characteristic of the variable filter so that vibration detected by the vibration detection unit becomes vibration without distortion relative to the input signal; and a control unit, wherein a transfer characteristic is set for the nonlinear-portion correction filter, the transfer characteristic correcting distortion of output from the speaker relative to the input signal due to a nonlinear characteristic of the speaker, and wherein the control unit is configured to determine whether or not an amplitude of vibration detected by the vibration detection unit deviates from a range considered normal relative to a level of an output signal output by the variable filter, and when the amplitude of the vibration detected by the vibration detection unit deviates from the range considered normal relative to the level of the output signal output by the variable filter, stop an update on the transfer characteristic of the variable filter updated by the adaptive operation of the adaptive-algorithm execution unit.

8. The speaker distortion correction device according to claim 7, wherein the control unit is configured to, when the amplitude of vibration detected by the vibration detection unit deviates, in an excess direction, from the range considered normal, check whether or not a center of the amplitude of the vibration detected by the vibration detection unit is positionally deviated from a defined center position, when the center is positionally deviated from the defined center position, estimate stiffness of the vibration system of the speaker from an input voltage input into the speaker, an input electric current input into the speaker, and the vibration detected by the vibration detection unit, and when the estimated stiffness is smaller than a defined stiffness range, estimate occurrence of a mechanical malfunction of the vibration system of the speaker.

9. The speaker distortion correction device according to claim 8, further comprising an amplifier configured to drive the speaker by an output signal output by the variable filter, wherein the control unit is configured to, when the amplitude of vibration detected by the vibration detection unit deviates, in the excess direction, from the range considered normal, and the center of the amplitude of the vibration detected by the vibration detection unit is not positionally deviated from the defined center position, estimate a relationship between stiffness of the vibration system of the speaker and a positional deviation of the vibration system from an input voltage input into the speaker, an input electric current input into the speaker, and the vibration detected by the vibration detection unit, when, in the estimated relationship, a variation in the stiffness relative to the positional deviation of the vibration system is gentle, check whether or not the input electric current input into the speaker relative to the input voltage input into the speaker is smaller than a defined magnitude, and when the input electric current input into the speaker relative to the input voltage input into the speaker is smaller than the defined magnitude, estimate occurrence of a heating abnormality of the speaker.

10. The speaker distortion correction device according to claim 7, wherein the control unit is configured to, when the amplitude of vibration detected by the vibration detection unit deviates, in an insufficiency direction, from the range considered normal, determine whether or not clipping within an allowable vibration range has occurred, the clipping within the allowable vibration range being a phenomenon in which a peak portion of waveform of the vibration detected by the vibration detection unit does not reach an upper or lower limit of the allowable vibration range of the vibration system of the speaker and is saturated and deformed at a fixed level, and when clipping has occurred, estimate occurrence of an abnormality that the vibration of the vibration system of the speaker is obstructed by an external object.

11. The speaker distortion correction device according to claim 10, further comprising an amplifier configured to drive the speaker by an output signal output by the variable filter, wherein the control unit is configured to, when the amplitude of vibration detected by the vibration detection unit deviates, in the insufficiency direction, from the range considered normal and clipping within the allowable vibration range has not occurred, estimate a relationship between stiffness of the vibration system of the speaker and a positional deviation of the vibration system from an input voltage input into the speaker, an input electric current input into the speaker, and the vibration detected by the vibration detection unit, when in the estimated relationship, a variation in the stiffness relative to the positional deviation of the vibration system is steep, check whether or not the input electric current input into the speaker relative to the input voltage input into the speaker is larger than a defined magnitude, and when the input electric current input into the speaker relative to the input voltage input into the speaker is larger than the defined magnitude, estimate occurrence of a heating abnormality of the speaker.

12. The speaker distortion correction device according to claim 11, wherein the control unit is configured to, when the amplitude of vibration detected by the vibration detection unit deviates, in the insufficiency direction, from the range considered normal, clipping within the allowable vibration range has not occurred, a variation in stiffness of the vibration system of the speaker relative to a positional deviation of the vibration system is steep, and an input electric current input into the speaker relative to an input voltage input into the speaker is not larger than the defined magnitude, check whether or not an environmental temperature is lower than a predetermined temperature, and when the environmental temperature is lower than the predetermined temperature, estimate occurrence of a freezing abnormality of the speaker.

13. A speaker distortion correction device for correcting distortion of output from a speaker relative to an input signal, the speaker distortion correction device comprising:

a vibration detection unit configured to detect vibration of a vibration system of the speaker;

a variable filter into which the input signal is input, the variable filter being configured to output an output signal that drives the speaker;

an adaptive-algorithm execution unit configured to execute a predetermined adaptive algorithm to perform an adaptive operation that updates a transfer characteristic of the variable filter so that vibration detected by the vibration detection unit becomes vibration without distortion relative to the input signal;

an error calculation unit configured to receive as inputs the input signal and a signal indicating vibration output by the vibration detection unit, and outputs an error signal to the adaptive-algorithm execution unit; and a control unit, wherein the control unit is configured to determine whether or not an amplitude of vibration detected by the vibration detection unit deviates from a range considered normal relative to a level of an output signal output by the variable filter, and when the amplitude of the vibration detected by the vibration detection unit deviates from the range considered normal relative to the level of the output signal output by the variable filter, stop an update on the transfer characteristic of the variable filter updated by the adaptive operation of the adaptive-algorithm execution unit.

14. The speaker distortion correction device according to claim 13, wherein the control unit is configured to, when the amplitude of vibration detected by the vibration detection unit deviates, in an excess direction, from the range considered normal, check whether or not a center of the amplitude of the vibration detected by the vibration detection unit is positionally deviated from a defined center position, when the center is positionally deviated from the defined center position, estimate stiffness of the vibration system of the speaker from an input voltage input into the speaker, an input electric current input into the speaker, and the vibration detected by the vibration detection unit, and when the estimated stiffness is smaller than a defined stiffness range, estimate occurrence of a mechanical malfunction of the vibration system of the speaker.

15. The speaker distortion correction device according to claim 14, further comprising an amplifier configured to drive the speaker by an output signal output by the variable filter, wherein the control unit is configured to, when the amplitude of vibration detected by the vibration detection unit deviates, in the excess direction, from the range considered normal, and the center of the amplitude of the vibration detected by the vibration detection unit is not positionally deviated from the defined center position, estimate a relationship between stiffness of the vibration system of the speaker and a positional deviation of the vibration system from an input voltage input into the speaker, an input electric current input into the speaker, and the vibration detected by the vibration detection unit, when, in the estimated relationship, a variation in the stiffness relative to the positional deviation of the vibration system is gentle, check whether or not the input electric current input into the speaker relative to the input voltage input into the speaker is smaller than a defined magnitude, and when the input electric current input into the speaker relative to the input voltage input into the speaker is smaller than the defined magnitude, estimate occurrence of a heating abnormality of the speaker.

16. The speaker distortion correction device according to claim 13, wherein the control unit is configured to, when the amplitude of vibration detected by the vibration detection unit deviates, in an insufficiency direction, from the range considered normal, determine whether or not clipping within an allowable vibration range has occurred, the clipping within the allowable vibration range being a phenomenon in which a peak portion of waveform of the vibration detected by the vibration detection unit does not reach an upper or lower limit of the allowable vibration range of the vibration system of the speaker and is saturated and deformed at a fixed level, and when clipping has occurred, estimate occurrence of an abnormality that the vibration of the vibration system of the speaker is obstructed by an external object.

17. The speaker distortion correction device according to claim 16, further comprising an amplifier configured to drive the speaker by an output signal output by the variable filter, wherein the control unit is configured to, when the amplitude of vibration detected by the vibration detection unit deviates, in the insufficiency direction, from the range considered normal and clipping within the allowable vibration range has not occurred, estimate a relationship between stiffness of the vibration system of the speaker and a positional deviation of the vibration system from an input voltage input into the speaker, an input electric current input into the speaker, and the vibration detected by the vibration detection unit, when in the estimated relationship, a variation in the stiffness relative to the positional deviation of the vibration system is steep, check whether or not the input electric current input into the speaker relative to the input voltage input into the speaker is larger than a defined magnitude, and when the input electric current input into the speaker relative to the input voltage input into the speaker is larger than the defined magnitude, estimate occurrence of a heating abnormality of the speaker.

18. The speaker distortion correction device according to claim 17, wherein the control unit is configured to, when the amplitude of vibration detected by the vibration detection unit deviates, in the insufficiency direction, from the range considered normal, clipping within the allowable vibration range has not occurred, a variation in stiffness of the vibration system of the speaker relative to a positional deviation of the vibration system is steep, and an input electric current input into the speaker relative to an input voltage input into the speaker is not larger than the defined magnitude, check whether or not an environmental temperature is lower than a predetermined temperature, and when the environmental temperature is lower than the predetermined temperature, estimate occurrence of a freezing abnormality of the speaker.

* * * * *